(12) United States Patent
Coupillaud et al.

(10) Patent No.: US 11,555,116 B2
(45) Date of Patent: Jan. 17, 2023

(54) USE OF A COPOLYMER OF ETHYLENE AND OF ACRYLATE(S) PREPARED IN A TUBULAR REACTOR FOR MODIFYING THE MELT RHEOLOGY OF A THERMOPLASTIC COMPOSITION

(71) Applicant: ARKEMA FRANCE, Colombes (FR)

(72) Inventors: Paul Coupillaud, Serquigny (FR); Sebastien Quinebeche, Serquigny (FR); Alain Bouilloux, Serquigny (FR)

(73) Assignee: SK Global Chemical Co., Ltd., Seoul (KR)

( * ) Notice: Subject to any disclaimer, the term of this patent is extended or adjusted under 35 U.S.C. 154(b) by 86 days.

(21) Appl. No.: 17/041,326

(22) PCT Filed: Mar. 26, 2019

(86) PCT No.: PCT/FR2019/050691
§ 371 (c)(1),
(2) Date: Sep. 24, 2020

(87) PCT Pub. No.: WO2019/186056
PCT Pub. Date: Oct. 3, 2019

(65) Prior Publication Data
US 2021/0163739 A1 Jun. 3, 2021

(30) Foreign Application Priority Data
Mar. 26, 2018 (FR) ...................................... 1852598

(51) Int. Cl.
| | | |
|---|---|---|
| *C08L 77/02* | (2006.01) | |
| *B29C 48/00* | (2019.01) | |
| *C08F 220/18* | (2006.01) | |
| *B29C 45/00* | (2006.01) | |
| *C08F 2/01* | (2006.01) | |
| *C08L 23/08* | (2006.01) | |

(52) U.S. Cl.
CPC .......... *C08L 77/02* (2013.01); *B29C 45/0001* (2013.01); *B29C 48/022* (2019.02); *C08F 2/01* (2013.01); *C08F 220/1804* (2020.02); *C08L 23/08* (2013.01); *C08L 2207/04* (2013.01)

(58) Field of Classification Search
USPC ..................................................... 525/52, 222
See application file for complete search history.

(56) References Cited

U.S. PATENT DOCUMENTS

| | | |
|---|---|---|
| 2006/0149004 A1 | 7/2006 | Lee et al. |
| 2006/0189747 A1 | 8/2006 | Joachimi et al. |
| 2006/0211810 A1 | 9/2006 | Persigehl et al. |
| 2007/0032614 A1 | 2/2007 | Goossens et al. |
| 2009/0209697 A1 | 8/2009 | Persigehl et al. |
| 2010/0099817 A1 | 4/2010 | Bizet et al. |

FOREIGN PATENT DOCUMENTS

| | | |
|---|---|---|
| CN | 1965031 A | 5/2007 |
| CN | 105504800 A | 4/2016 |
| EP | 0471566 A1 | 2/1992 |
| FR | 2938845 A1 | 5/2010 |
| WO | 2010061128 A1 | 6/2010 |

*Primary Examiner* — Fred M Teskin
(74) *Attorney, Agent, or Firm* — The Webb Law Firm

(57) ABSTRACT

Provided herein is a copolymer of ethylene and acrylate(s) having a melt flow index (MFI) greater than or equal to 50 g/10 minutes, obtained by free-radical copolymerisation under high pressure carried out in a tubular reactor, and methods of using the same. Also provided herein is a thermoplastic composition, particularly intended to be extruded or injection moulded, having one or more copolymers of ethylene and acrylate(s) at a content ranging from 0.1 to 20 wt. %, and one or more thermoplastic polymers.

17 Claims, No Drawings

USE OF A COPOLYMER OF ETHYLENE AND OF ACRYLATE(S) PREPARED IN A TUBULAR REACTOR FOR MODIFYING THE MELT RHEOLOGY OF A THERMOPLASTIC COMPOSITION

CROSS-REFERENCE TO RELATED APPLICATIONS

This application is the United States national phase of International Application No. PCT/FR2019/050691 filed Mar. 26, 2019, and claims priority to French Patent Application No. 1852598 filed Mar. 26, 2018, the disclosures of which are hereby incorporated by reference in their entirety.

BACKGROUND

The present invention relates to the use of a copolymer of ethylene and acrylate(s) having a melt flow index (MFI) greater than or equal to 50 g/10 minutes, obtained by free-radical copolymerisation process under high pressure carried out in a tubular reactor, to modify the melt rheology of a thermoplastic composition.

The present invention also relates to a thermoplastic composition, particularly intended to be extruded or injection moulded, comprising one or more copolymers of ethylene and acrylate(s), as previously defined, with a content ranging from 0.1 to 20 wt. %, and one or more thermoplastic polymers.

The invention also deals with a method of preparing the said thermoplastic composition as well as the use thereof for manufacturing a part, particularly by injection moulding.

Thermoplastic parts, capable of being used in the field of electronics, automobiles, computers, electrical appliances or in the electrical industry, are generally prepared from thermoplastic compositions that are transformed or shaped by various methods, for example extrusion, injection moulding, blow moulding (such as extrusion-blow moulding or injection-blow moulding), compression moulding or a thermoforming method.

In particular, the injection moulding method makes it possible to manufacture in a single operation finished parts capable of having complex forms in very large quantities. Such a method usually consists in pouring a thermoplastic composition in granular form, possibly in the presence of additives such as colorants and/or plasticizers, into a hopper to feed a heated barrel. The thermoplastic composition is thus softened to the molten state then mixed and forced, by an endless type worm piston housed in the barrel, to a mould, cooled and sealably closed, having the form of the part intended to be produced. Upon contact with the mould, the thermoplastic composition thus takes the shape thereof and solidifies. At the end of the process, the mould used for forming is opened to recover the part.

Alternatively, the extrusion method makes it possible to manufacture parts of great length such as tubes, pipes or semi-finished products such as plates, optical fibres and sections. Such a method usually consists in pouring a thermoplastic composition in granular form, possibly in the presence of additives such as colourants and/or plasticizers, into a hopper to feed an extruder. Inside the extruder, the composition is heated and softened, then mixed by a worm screw. The screw forces the thermoplastic composition towards the output of the extruder. The output head of the extruder gives its shape to the part intended to be produced. The part exits continuously, then is cooled to be cut to the desired length.

Thermoplastic compositions generally include at least one thermoplastic polymer and possibly additives that are selected in accordance with the planned technical applications, production costs and desired performance level relative to the mechanical properties of the parts produced.

Indeed, the obtained thermoplastic parts, once cooled, must have sufficiently satisfactory mechanical properties relative to the technical field considered, for example relative to impact strength, elastic strain, flexural modulus, rigidity or rupture stress. Reinforcing fillers such as glass fibres are commonly used in thermoplastic compositions to improve the mechanical properties of the parts once cooled.

Moreover, the thermoplastic compositions employed must also have a rheological behaviour, i.e. rheological properties, in the molten state, compatible with the previously mentioned forming methods. In particular, these compositions must be sufficiently fluid in the molten state to be able to be mixed, manipulated and easily and efficiently forced into the devices used for shaping, such as injection moulds.

In other words, the thermoplastic compositions must have a melt viscosity low enough to be able to be used efficiently in the transformation methods without significantly increasing production costs related to the characteristics and parameters of the shaping devices.

However, it appears that increasing the melt fluidity of thermoplastic compositions, which is done to facilitate their usage during the different transformation processes, has the disadvantage of leading to a reduction in the mechanical properties of the thermoplastic parts. In other words, lowering the viscosity of the hot melt thermoplastic compositions is generally accompanied by an uncontrolled degradation of the desired mechanical properties of the parts once they are cooled.

For example, the use of thermoplastic polymers having a low viscosity makes it possible to increase the melt fluidity of the thermoplastic compositions, but at the same time leads to a degradation of the mechanical properties, particularly impact strength, of the parts obtained.

In order to overcome these various disadvantages, it has already been proposed in the prior art to use additives capable of increasing the fluidity, and consequently lowering the viscosity, of the hot melt thermoplastic compositions.

In general, the presence of additives is likely to result in a problem of increased manufacturing costs while continuing to result in negative effects on the mechanical properties of the manufactured parts. Furthermore, the addition of additives can lead to problems of homogeneity during preparation of the thermoplastic composition prior to shaping, which usually results in a heterogeneity on the surface of the part.

In this respect, patent applications US 2006/0189747 and US 2006/0211810 describe the use of copolymers comprising at least one unit derived from an olefin and at least one unit derived from a (meth)acrylic ester of an aliphatic alcohol having a melt flow index (MFI) greater than or equal to 50 g/10 minutes, obtained by a polymerisation process carried out in an autoclave reactor, in order to increase the melt fluidity of a semi-crystalline thermoplastic polyamide or a polyester.

Similarly, patent application US 2009/0209697 describes the use of copolymers comprising at least one unit derived from an olefin and at least one unit derived from a (meth)acrylic ester of an aliphatic alcohol having a melt flow index (MFI) greater than or equal to 100 g/10 minutes, obtained by a polymerisation process carried out in an autoclave reactor, in order to increase the melt fluidity of a thermoplastic polycarbonate.

However, thermoplastic compositions comprising copolymers, such as previously described, obtained by the polymerisation process in an autoclave reactor, still result in parts that, once cooled, have mechanical properties, particularly flexural modulus and impact strength, that are unsatisfactory relative to the technical applications sought.

SUMMARY

Therefore, one of the objectives of the present invention is to use compounds capable of effectively modifying the melt rheological properties of compositions based on thermoplastic polymer(s) while attenuating the degradation of the mechanical properties of the thermoplastic parts obtained after shaping.

In other words, there is a real need for proposing thermoplastic compositions sufficiently fluid in the molten state to be used effectively and easily in various transformation or shaping processes, particularly by injection moulding, while being capable of resulting in parts having good mechanical properties relative to the proposed technical applications.

In light of the foregoing, the invention more particularly has the objective of increasing the melt fluidity, i.e. of decreasing the viscosity, of thermoplastic compositions used during an extrusion or injection moulding process while resulting in parts having satisfactory impact strength.

Therefore, an object of the present invention is the use of a copolymer of ethylene and acrylate(s) having a melt flow index (MFI) greater than or equal to 50 g/10 minutes, obtained by free-radical copolymerisation under high pressure carried out in a tubular reactor, to modify the rheology of a hot melt thermoplastic composition, the melt flow index (MFI) being measured at a temperature of 190° C. under a load of 2160 grams.

In other words, the invention relates in particular to the use of a copolymer of ethylene and of acrylate(s), as previously described, to modify the melt rheological properties of a composition comprising at least one thermoplastic polymer.

Thus, the copolymer used in accordance with the present invention has a melt flow index (MFI) greater than or equal to 50 g/10 minutes, as previously defined, and is obtained by a free-radical copolymerisation method under high pressure carried out in a tubular reactor between the ethylene and one or more acrylates.

DETAILED DESCRIPTION

The copolymer comprising at least one unit derived from the ethylene and at least one unit derived from one or more acrylates according to the present invention has the advantage on the one hand of increasing the melt fluidity of a thermoplastic composition, which makes it possible to facilitate its use during transformation or shaping processes, and on the other hand of attenuating the degradation of the mechanical properties of a part that may be prepared from such a thermoplastic composition.

More specifically, the use of the copolymer according to the invention makes it possible to decrease the melt viscosity of a thermoplastic composition, which greatly facilitates the use thereof during an extrusion or injection moulding process while guaranteeing that the part obtained has satisfactory impact strength relative to the field and planned technical applications.

Thus, the use of the copolymer according to the invention makes it possible to preserve, and to a certain extent even prevent. uncontrolled deterioration of the mechanical parameters, particularly impact strength, of parts relative to the use of a thermoplastic composition free of additives, namely composed of one or more thermoplastic polymers.

Moreover, the use of the copolymer of ethylene and acrylate(s) according to the invention enables better preservation of the mechanical properties, in particular impact strength, of the parts produced, compared to the copolymer having identical units and obtained by free-radical copolymerisation under high pressure performed in an autoclave reactor.

Indeed, the method of free-radical copolymerisation under high-pressure performed in a tubular reactor between ethylene and one or more acrylates results in a copolymer of ethylene and acrylate(s) having physical properties that are different from those conferred by a free-radical copolymerisation method under high pressure performed in an autoclave reactor between the same monomers.

Thus, the physical properties conferred by the method of free-radical copolymerisation under high pressure performed in a tubular reactor make it possible to influence the melt fluidity of thermoplastic compositions as well as the mechanical properties of the parts manufactured more efficiently than a method of free-radical copolymerisation under high pressure performed in an autoclave reactor.

As used in the present invention, "physical properties" is understood as meaning that the copolymer of ethylene and acrylates has one or more rheological characteristics combined with one or more mechanical characteristics capable of resulting in an increase of the melt fluidity of the thermoplastic compositions while guaranteeing good mechanical properties of the parts obtained from these compositions.

In this way, the copolymer of ethylene and acrylate(s) according to the invention has the advantage of facilitating the implementation of transformation or shaping methods of the thermoplastic compositions, particularly of extrusion and injection moulding processes, without increasing the production costs related to these processes.

For example, the use of the copolymer of ethylene and acrylates according to the invention improves the implementation of an injection moulding process without having to modify the size of the mould or increase the pressure exerted in the injection unit comprising the heated barrel.

In the sense of the present invention, "high-pressure" indicates a pressure of more than 50 MPa.

An object of the invention is also a thermoplastic composition comprising:
  one or more thermoplastic polymers, and
  one or more copolymers of ethylene and acrylate(s) having a melt flow index (MFI) greater than or equal to 50 g/10 minutes, obtained by a free-radical copolymerisation process under high pressure in a tubular reactor, having a content ranging from 0.1 to 20 wt. %, calculated relative to the total weight of the composition; the melt flow index (MFI) being measured at a temperature of 190° C. under a load of 2160 grams.

The thermoplastic composition according to the invention has a melt fluidity sufficiently high to be used effectively in different transformation processes to prepare parts.

Indeed, the hot melt thermoplastic composition has a high fluidity at the shear rates required by the shaping processes.

More specifically, the hot melt thermoplastic composition has a sufficiently low viscosity to be shaped efficiently during an extrusion or injection moulding process in order to manufacture thermoplastic parts.

The thermoplastic composition thus makes it possible to obtain parts, particularly moulded or extruded, the mechanical properties whereof, particularly impact strength, are preserved.

The present invention also concerns a process of preparing the thermoplastic composition as previously defined, comprising at least one step of mixing:
- one or more thermoplastic polymers, and
- one or more copolymers of ethylene and acrylate(s) having a melt flow index (MFI) greater than or equal to 50 g/10 minutes, obtained by a free-radical copolymerisation process under high pressure in a tubular reactor, having a content ranging from 0.1 to 10 wt. %, calculated relative to the total weight of the mixture the melt flow index (MFI) being measured at a temperature of 190° C. under a load of 2160 grams.

The preparation method according to the invention is easy to implement.

The mixing step can advantageously comprise an extrusion step.

Another object of the invention concerns the use of the thermoplastic composition as previously described for the preparation, particularly for extrusion or injection moulding, of a part.

The invention also relates to a part capable of being obtained from the thermoplastic composition as previously described, preferably by a process of extrusion or injection moulding of the said thermoplastic composition.

The part thus obtained advantageously has satisfactory impact strength.

The part thus obtained can in particular be used in the field of automobiles, the electrical industry, telecommunications, computers or electronics.

Other characteristics and advantages of the invention will be seen more clearly from the following description and examples.

In the following, and unless otherwise indicated, the ranges of values used in this document are inclusive.

The expression "at least one" is equivalent to the expression "one or more".

In terms of the present invention, the melt flow index of a polymer corresponds to the weight of molten polymer flowing through an oblong die, in particular cylindrical in shape, for a given time under given temperature conditions.

The melt flow index (MFI) is measured pursuant to the currently used methods to characterize thermoplastic materials in order to obtain information about extrudability as well as the shaping possibilities of the material such as those described according to the standard ISO 1133 at a temperature of 190° C. under a load of 2160 grams (units expressed in g/10 minutes).

Thus, the melt flow indices (MFI), such as those mentioned hereinafter, were measured at a temperature of 190° C. under a load of 2160 g (units expressed in g/10 minutes) according to standard ISO 1133 unless otherwise indicated.

Use of the Copolymer

As indicated above, the invention relates to the use of a copolymer of ethylene and acrylate(s) having a melt flow index (MFI) greater than or equal to 50 g/10 minutes, obtained by free-radical copolymerisation under high pressure carried out in a tubular reactor, to modify the melt rheology of a thermoplastic composition.

The copolymer of ethylene and acrylate(s) according to the invention has a melt flow index (MFI) greater than or equal to 50 g/10 minutes, preferably ranging from 50 to 900 g/10 minutes, and more preferentially ranging from 300 to 600 g/10 minutes.

The copolymer of ethylene and acrylate(s) used according to the invention preferentially has a melt flow index (MFI) greater than 50 g/10 minutes, which means that the value of 50 g/10 minutes is excluded, i.e. the melt flow index is strictly greater than 50 g/10 minutes, preferably a melt flow index (MFI) varying from 300 to 600 g/10 minutes.

The copolymer of ethylene and acrylate(s) used according to the invention is a copolymer comprising at least one unit derived from ethylene and at least one unit derived from at least one acrylate.

Thus, the unit derived from at least one acrylate can be derived from a mixture of a plurality of acrylates.

Preferably, the copolymer of ethylene and acrylate according to the invention comprises at least one unit derived from ethylene and at least one unit derived from at least one acrylate. In other words, the copolymer according to the invention is preferably a copolymer of ethylene and acrylate.

In particular, the acrylate is selected from the group consisting of alkly (meth)acrylates, especially the $C_1$-$C_{30}$ alkyl (meth)acrylates, the arylalkyl (meth)acrylates and the (meth)acrylates comprising an epoxy group.

The alkyl and arylalkyl groups can be linear or branched and comprise from 1 to 30 carbon atoms, preferably from 1 to 24 carbon atoms.

The alkyl and arylalkyl groups can also contain ether or thioether functions.

Preferably, the alkyl (meth)acrylates are selected from the group consisting of methyl acrylate, ethyl acrylate, n-butyl acrylate, isobutyl acrylate, ethyl-2-hexyl acrylate, cyclohexyl acrylate, n-octyl acrylate, methyl methacrylate, ethyl methacrylate and butyl methacrylate, and mixtures thereof.

Preferably, the (meth)acrylates comprising an epoxy group are selected from the group composed of glycidyl methacrylate, glycidyl acrylate and mixtures thereof.

Advantageously, the acrylate is selected from the group consisting of alkyl (meth)acrylates, in particular $C_1$-$C_{30}$ alkyl (meth)acrylates, and more particularly $C_1$-$C_{24}$ alkyl (meth)acrylates.

More advantageously, the acrylate is selected from the group composed of methyl acrylate, butyl acrylate, ethyl-2-hexyl acrylate, or mixtures thereof, particularly butyl acrylate.

According to one embodiment, the copolymer according to the invention can possibly comprise one or more additional comonomers other than ethylene and acrylate.

Preferably, the additional comonomers are selected from the group consisting of olefinic comonomers.

In particular, the olefinic comonomers can be selected from the group consisting of anhydrides of carboxylic acids, vinyl esters, such as vinyl acetate or pivalate acetate, alpha-olefins such as propene, 1-butene, 1-hexene, 1-octene and 4-methyl-1-pentene, unsaturated carboxylic acids such as (meth)acrylic acid, maleic acid and fumaric acid, (meth)acrylic acid derivatives such as (meth)acrylonitrile and (meth)acrylic amide, vinyl esters such as vinyl methyl ether and vinyl phenyl ether and vinyl aromatic compounds such as styrene and alpha-methyl styrene, or mixtures thereof.

Preferably, the content by weight of additional comonomers varies from 0.01 to 3 wt. %, relative to the total weight of the copolymer.

Preferably, the copolymer employed according to the invention does not contain additional olefin comonomers other than ethylene and acrylate.

According to one embodiment, the copolymer used according to the invention comprises:
- at least one unit derived from ethylene,
- at least one unit derived from at least one alkyl (meth) acrylate, in particular a $C_1$-$C_{24}$ alkyl methacrylate, preferably selected from the group consisting of methyl acrylate, butyl acrylate and ethyl-2-hexylacrylate and mixtures thereof.

According to this embodiment, the copolymer according to the invention preferably comprises at least one unit derived from ethylene and at least one unit derived from butyl acrylate.

Thus, the copolymer used according to the invention is advantageously a copolymer of ethylene and butyl acrylate.

The content by weight of ethylene can vary from 50 to 95 wt. %, preferably 55 to 80 wt. %, relative to the total weight of the polymer.

The content by weight of acrylate can vary from 5 to 50 wt. %, preferably 15 to 40 wt. %, relative to the total weight of the polymer.

Preferably, the copolymer used according to the invention comprises:
- from 50 to 95 wt. %, preferably from 55 to 80 wt. % of ethylene,
- from 5 to 95 wt. %, preferably from 15 to 40 wt. %, of butyl acrylate,
the contents by weight being calculated relative to the total weight of the copolymer.

According to one embodiment, the copolymer used according to the invention has a melt flow index ranging from 300 to 600 g/10 minutes and comprises:
- at least one unit derived from ethylene,
- at least one unit derived from at least one alkyl (meth) acrylate, in particular a $C_1$-$C_{24}$ alkyl methacrylate, preferably selected from the group consisting of methyl acrylate, butyl acrylate and ethyl-2-hexylacrylate and mixtures thereof.

According to this embodiment, the copolymer used according to the invention preferably comprises at least one unit derived from ethylene and at least one unit derived from butyl acrylate.

Thus, the copolymer used according to the invention is advantageously a copolymer of ethylene and butyl acrylate having a melt flow index ranging from 300 to 600 g/10 minutes.

Preferably, the copolymer used according to the invention is sold under the commercial name Lotryl® T35BA320T by the Arkema France company.

According to the present invention, the copolymer of ethylene and acrylate(s) is used to modify the molten rheological properties of a thermoplastic composition.

Preferably, the copolymer of ethylene and acrylate(s) is used to increase the melt flow rate of a thermoplastic composition.

In other words, the copolymer of ethylene and acrylate(s) is preferably used to lower the melt viscosity of a thermoplastic composition.

The copolymer of ethylene and acrylate(s) also makes it possible to lower the density or contraction level of the thermoplastic composition, particularly in a mould, which makes it possible to reduce possible deformations of the part obtained.

The copolymer of ethylene and acrylate(s) also makes it possible to modify the flow rate, particularly vertical flow rate, of the thermoplastic composition.

As used in the present invention, "thermoplastic composition" means a composition comprising at least one thermoplastic polymer.

Preferably, the copolymer of ethylene and acrylate(s) is used to modify the melt rheological properties of a composition comprising at least one thermoplastic polymer as defined hereinafter, preferably a polyamide.

Method of Preparing the Copolymer

The method of preparing the copolymer according to the invention comprises a step of free-radical copolymerisation under high pressure of the ethylene and at least one acrylate performed in a tubular reactor.

The free-radical copolymerisation generally takes place in the presence of one or more initiators.

The initiator(s) enable free radicals to be formed in order to initiate the free radical copolymerisation of the ethylene.

The initiator(s) can be selected from a group consisting of organic peroxides, oxygen, azobisisobutyronitrile (AIBN) and mixtures thereof.

Preferably, the initiator(s) is or are selected from the group consisting of organic peroxides, oxygen and mixtures thereof.

Still more preferentially, the initiator(s) is or are selected from the group consisting of organic peroxides.

Preferably, the organic peroxides are selected from the group consisting of peroxy esters, dialkyl peroxides, hydroperoxides or peroxyketals.

Such peroxides are in particular marketed by the Arkema company under the commercial name Luperox®.

Examples of peroxy esters can include t-butyl peroxy-2-ethylhexanoate (Luperox® 26), t-butyl peroxyacetate (Luperox® 7), t-amyl peroxyacetate (Luperox® 555), t-butyl perbenzoate (Luperox® P), t-amyl perbenzoate (Luperox® TAP) and OO-t-butyl 1-(2-ethylhexyl)monoperoxycarbonate (Luperox® TBEC).

Examples of dialkyl peroxides can include 2,5-dimethyl-2,5-di-(t-butylperoxy)hexane (Luperox® 101), dicumyl peroxide (Luperox® DC), 1'alpha-alpha'-bis (t-butylperoxy) diisopropylbenzene (Luperox® F40), di-t-butyl-peroxide (Luperox® DI), di-t-amyl-peroxide (Luperox® DTA) and 2,5-dimethyl-2,5-di-(t-butylperoxy)hexyne-3 (Luperox® 130).

For hydroperoxide, tert-butyl-hydroperoxide (Luperox® TBH 70) can be mentioned.

Examples of peroxyketals can include 1,1-di-(t-butylperoxy)-3,3,5-trimethylcyclohexane (Luperox® 231), ethyl-3,3-di-(t-butylperoxybutyrate) (Luperox® 233) or ethyl-3,3-di-(t-amylperoxybutyrate) (Luperox® 533).

Preferentially, the organic peroxides are selected from the group consisting of dialkyl peroxides, particularly 2,5-dimethyl-2,5-di-(t-butylperoxy)hexane sold under the commercial name of Luperox® 101.

The organic peroxide(s) is or are generally diluted in a solvent or a mixture of solvents. The solvent(s) can be selected from among $C_1$-$C_{20}$ alkanes, particularly $C_3$-$C_{10}$, and more particularly $C_5$-$C_8$, and preferentially heptane.

The initiator(s) is or are preferably present in an amount by weight of between 20 and 1000 ppm relative to the amount by weight of ethylene.

The copolymerisation of the ethylene is done at an initiation temperature varying between 100 to 200° C., preferably from 120 to 160° C.

The free-radical copolymerisation preferentially takes place at a pressure varying from 500 bar (50 MPa) to 3000 bar (300 MPa), preferably from 1200 bar (120 MPa) to 3000 bar (300 MPa), more preferably from 1200 bar (120 MPa) to 2600 bar (260 MPa).

The free-radical copolymerisation at high pressure takes place in a tubular reactor at a temperature of between 150° C. and 320° C.

The introduction of the mixture of ethylene and acrylates, as previously defined, is preferably carried out at the head of the tubular reactor. The initiator or mixture of initiators is injected by means of a high-pressure pump at the head of the reactor, behind the place of insertion of the mixture of ethylene and acrylate(s).

The mixture of the ethylene and acrylate(s) can be injected in at least one other point of the reactor; this injection is followed by a new injection of initiator or mixture of initiators, according to the multipoint injection technique. When the multipoint injection technique is used, the mixture is preferably injected such that the weight ratio of the mixture injected at the reactor entrance to the total mixture injected is between 10 and 90%.

According to one embodiment, the method of preparing a copolymer of ethylene and acrylate(s), as previously defined, comprises a step of free-radical copolymerisation under high pressure, performed in a tubular reactor,
of ethylene,
at least acrylate selected from alkyl (meth)acrylate(s), in particular a $C_1$-$C_{24}$ alkyl methacrylate, preferably selected from the group consisting of methyl acrylate, butyl acrylate and ethyl-2-hexylacrylate and mixtures thereof,
in the presence of one or more initiators, particularly selected from the group consisting of organic peroxides, oxygen and mixtures thereof.

According to this embodiment, the acrylate is butyl acrylate.

According to this embodiment, the initiator is an organic peroxide selected from the group consisting of dialkyl peroxides, in particular 2,5-dimethyl-2,5-di-(t-butylperoxy) hexane.

Other methods of tubular high-pressure polymerisation or copolymerisation are, for example, those described in US2006/0149004 A1 or in US2007/0032614 A1.

Thermoplastic Composition

As mentioned above, the thermoplastic composition comprises:
at least one thermoplastic polymer, and
at least one copolymer having a melt flow index (MFI) greater than or equal to 50 g/10 minutes comprising:
at least one unit derived from ethylene,
at least one unit derived from at least one acrylate,
the said copolymer being obtained by a free-radical copolymerisation method under high pressure in a tubular reactor,
the said copolymer being present in the thermoplastic composition in a content ranging from 0.1 to 20 wt. % relative to the total weight of the composition, and
the melt flow index (MFI) of the copolymer being measured at a temperature of 190° C. under a load of 2160 g.

The copolymer of ethylene and acrylate(s) is as described previously.

Preferably, the copolymer of ethylene and acrylate(s) according to the invention is present in a content ranging from 0.25 to 20 wt. %, preferably in a content ranging from 0.25 to 15 wt. %, preferentially in a content ranging from 1 to 20 wt. %, more preferentially in a content ranging from 1 to 15 wt. %, and even more preferably in a content ranging from 1 to 10 wt. % relative to the total weight of the composition.

The thermoplastic polymer is preferably selected from the group consisting of polyamides, polyesters, polycarbonates, phenylene polysulfides, polyacetals and mixtures thereof.

According to one embodiment, the thermoplastic polymer is a polyamide, in particular a semi-aromatic polyamide.

The semi-aromatic polyamide comprises at least a first semi-aromatic repeating unit obtained from the polycondensation of a diamine and an aromatic dicarboxylic acid.

The diamine advantageously comprises from 4 to 36 carbon atoms.

The diamine can be selected from among aliphatic diamines, cycloaliphatic diamines and alkylaromatic diamines. These diamines can be linear. They can also be branched and include at least one alkyl branch on the main chain; this alkyl branch can itself be linear or branched.

When the diamine is aliphatic and linear, it is of formula $H_2N$—$(CH_2)_x$—$NH_2$.

Thus, the diamine can be selected from among butanediamine (x=4), pentanediamine (x=5), hexanediamine also called hexamethylenediamine (x=6), heptanediamine (x=7), octanediamine (x=8), nonanediamine (x=9), decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22) and diamines obtained from fatty acids. Such diamines all have the advantage of being able to be biosourced and include organic carbon derived from biomass, which can be determined in accordance with the standard ASTM D6866.

When the diamine is cycloaliphatic, it can be selected from among bis(3,5-dialkyl-4-aminocyclohexyl)methane, bis(3,5-dialkyl-4-aminocyclohexyl)-ethane, bis(3,5-dialkyl-4-aminocyclohexyl)propane, bis(3,5-dialkyl-4-amino-cyclohexyl)butane, bis-(3-methyl-4-aminocyclohexyl)-methane (BMACM or MACM), p-bis(aminocyclohexyl)-methane (PACM) and isopropylidenedi(cyclo-hexylamine) (PACP). The cycloaliphatic diamine can also include the following carbon skeletons: norbornyl methane, cyclohexylmethane, dicyclohexylpropane, di(methylcyclohexyl), di(methylcyclohexyl) propane. A non-exhaustive list of these cyclo-aliphatic diamines is provided in the publication "Cycloaliphatic Amines" (Encyclopaedia of Chemical Technology, Kirk-Othmer, 4th Edition (1992), pp. 386-405).

When the diamine is alkyl-aromatic, it can be chosen from among 1,3-xylylene diamine and 1,4-xylylene diamine.

Advantageously, the diamine is an aliphatic diamine.

Preferably, the diamine is a linear aliphatic diamine.

The aromatic dicarboxylic acid can be chosen from among terephthalic acid (denoted T), isophthalic acid (denoted I), phthalic acid and naphthalenic acids. The aromatic dicarboxylic acids that have just been cited can also comprise one or more alkyl branches, these alkyl branches being linear or branched. Thus, 2-methyl-terephtalic acid can be cited. Advantageously, the semi-aromatic polyamide has a melting point of more than 240° C., advantageously between 240° C. and 310° C., and more particularly between 260° C. and 280° C.

In a yet more preferred way, the aromatic dicarboxylic acid is terephthalic acid (T).

According to a particular version of the invention, the semi-aromatic polyamide can comprise more than 50 mol % of semi-aromatic repeating unit(s), advantageously more than 60 mol %.

The semi-aromatic polyamide can consist of 100 mol % of one or more semi-aromatic repeating units as previously described.

In particular, according to a first aspect of the invention, the semi-aromatic polyamide can be a homopolymer and be composed only of first repeating units derived from the polycondensation reaction of a diamine and an aromatic dicarboxylic acid.

Thus, the semi-aromatic polyamide can be selected from among the homopolyamides 6.T, 9.T, 10.T, 11.T, 12.T, 14.T, 18.T, 6.I, 9.I, 10.I, 11.I, 12.I, 14.I and 18.I.

According to a second aspect of the invention, the semi-aromatic polyamide can be a copolymer consisting of one or more first repeating units derived from the polycondensation reaction of a diamine and two aromatic dicarboxylic acids or the polycondensation reaction of two diamines and one aromatic dicarboxylic acid.

Thus, in the first case, the semi-aromatic polyamide can be chosen from among the copolyamides 6.T/6.I, 9.T/9.I, 10.T/10.I, 11.T/11.I and 12.T/12.I. In the second case, the semi-aromatic polyamide can be chosen from among the copolyamides 6.T/9.T, 6.T/10.T, 6.T/11.T, 6.T/12.T, 9.T/10.T, 9.T/11.T, 9.T/12.T, 10.T/11.T, 10.T/12.T and 11.T/12.T. A similar list can be prepared, by replacing terephthalic acid (T) with isophthalic acid (I).

According to a third aspect of the invention, the semi-aromatic polyamide can be a copolymer comprising first repeating units derived from the polycondensation reaction of at least two diamines and at least two aromatic dicarboxylic acids. In addition to the first semi-aromatic repeating unit that has just been detailed and which is obtained from the polycondensation of a diamine and an aromatic dicarboxylic acid, the semi-aromatic polyamide of the composition according to the invention can also comprise at least one additional repeating unit (or a second repeating unit) different from the first semi-aromatic repeating unit(s) as previously described.

This additional repeating unit can be selected from the group consisting of a unit obtained from an aminocarboxylic acid, a unit obtained from a lactam and a unit of formula (Ca diamine).(Cb diacid), "a" representing the number of carbon atoms of the diamine and "b" representing the number of carbon atoms of the diacid.

Advantageously, a and b are each one between 4 and 36.

When this additional repeating unit is obtained from an aminocarboxylic acid, this aminocarboxylic acid can be chosen from among 9-aminononanoic acid (9), 10-aminodecanoic acid (10), 10-aminoundecanoic acid (11), 12-aminododecanoic acid (12) and 11-aminoundecanoic acid (11). The aminocarboxylic acid can also be branched. For example, N-heptyl-11-aminoundecanoic acid can be mentioned.

When this additional repeating unit is obtained from a lactam, this lactam can be chosen from among pyrrolidinone, 2-piperidinone, enantholactam, caprylolactam, pelargolactam, decanolactam (10), undecanolactam (11) and lauryl lactam (12).

When this additional repeating unit is a unit of formula (Ca diamine).(Cb diacid), it is obtained from the polycondensation of a diamine, the Ca diamine, and a carboxylic acid, the Cb diacid, it being specified that this dicarboxylic acid is not an aromatic dicarboxylic acid.

This Ca diamine can be selected from the group consisting of aliphatic diamines, cycloaliphatic diamines and alkylaromatic diamines. These Ca diamines can be linear. They can also be branched and include at least one alkyl branch on the main chain; this alkyl branch can itself be linear or branched.

The diamines described above for obtaining the first semi-aromatic repeating unit can also be used as Ca diamine for obtaining the second repeating unit. Thus, the Ca diamines can be selected from among the diamines used for obtaining the semi-aromatic unit previously described.

The dicarboxylic acid (Cb diacid) used to obtain the additional repeating unit can be selected from among aliphatic dicarboxylic acids and cycloaliphatic dicarboxylic acids. The dicarboxylic acids can be linear. They can also be branched and include at least one alkyl branch on the main chain; this alkyl branch can itself be linear or branched.

When the dicarboxylic acid (Cb diacid) is aliphatic and linear, it can be selected from among succinic acid (4), pentanedioic acid (5), adipic acid (6), heptanedioic acid (7), octanedioic acid (8), azelaic acid (9), sebacic acid (10), undecanedioic (11), dodecanedioic acid (12), brassylic acid (13), tetradecanedioic acid (14), hexadecanedioic acid (16), octadecanedioic acid (18), octadecenedioic acid (18), eicosanedioic acid (20), docosanedioic acid (22) and dimers of fatty acids containing 36 carbon atoms.

The dimers of fatty acids mentioned above are dimerised fatty acids obtained by oligomerisation or polymerisation of hydrocarbonated long-chain unsaturated mono basic fatty acids (such as linoleic acid and oleic acid), as described in particular in the document EP 0 471 566.

When the dicarboxylic acid (Cb diacid) is cycloaliphatic, it can include the following carbon skeletons: norbornyl methane, cyclohexane, cyclohexylmethane, dicyclohexylmethane, dicyclohexylpropane, di(methylcyclohexyl), di(m-ethylcyclohexyl) propane.

Thus, the additional repeating unit of the semi-aromatic polyamide can in particular designate the following units 6, 11, 12, 6.10, 6.12, 6.14, 6.18, 10.10, 10.12, 10.14, 10.18 and 12.12.

According to a fourth aspect of the invention, the semi-aromatic polyamide can be a copolymer consisting of first semi-aromatic repeating units derived from the polycondensation reaction of a diamine and an aromatic dicarboxylic acid, additional repeating units derived either from an aminocarboxylic acid, or a lactam, or from the polycondensation of a Ca diamine and a Cb diacid as described above.

Among the possible combinations, the following copolyamides are of particular interest: these are copolyamides of a formula chosen from among 11/6.T, 12/6.T, 6.10/6.T, 6.12/6.T, 10.10/6.T, 10.12/6.T, 12.12/6.T, 11/9.T, 12/9.T, 6.10/9.T, 6.12/9.T, 10.10/9.T, 10.12/9.T, 12.12/9.T, 11/10.T, 12/10.T, 6.10/10.T, 6.12/10.T, 10.10/10.T, 10.12 10.T and 12.12/10.T.

According to a fifth aspect of the invention, the semi-aromatic polyamide can be a copolymer comprising first semi-aromatic repeating units derived from the polycondensation reaction of at least one diamine and at least one aromatic dicarboxylic acid and second repeating units derived from at least one aminocarboxylic acid, at least one lactam and/or the polycondensation of a Ca diamine and a Cb diacid as described above.

Among the multiple possible combinations, in particular it is possible to cite the copolyamides corresponding to one of the formulas selected from among:
  6/11/10.T, 6/12/10.T, 11/12/10.T, 11/6.10/10.T, 12/6.10/10.T, 11/10.6/10.T, 12/10.6/10.T, these copolyamides all comprising a first semi-aromatic repeating unit 10.T and two second repeating units,
  6/6.T/10.T, 11/6.T/10.T, 12/6.T/10.T, these copolyamides all comprising two second semi-aromatic repeating units 6.T and 10.T and a second repeating unit 1,
  11/9.T/9.I, 12/9.T/9.I, 11/10.T/10.I, 12/10.T/10.I, these copolyamides all comprising two first semi-aromatic repeating units and one second repeating unit, 6/11/6.T/10.T, 11/12/6.T/10.T, these copolyamides all comprising two first repeating units 6.T and 10.T and two second repeating units.

Within the scope of the present invention, it can be advantageous to use first, and if appropriate second, repeating units which are or will be obtained, in whole or in part from biosourced diamines, carboxylic acids, amino-carboxylic acids and/or lactams, i.e. including organic carbon derived from biomass, which can be determined in accordance with the standard ASTM D6866.

According to another embodiment, the thermoplastic polymer is a polyester.

The term polyester designates polymers that are saturated condensation products of glycols and dicarboxylic acids or derivatives thereof.

Preferably, they comprise condensation products of aromatic dicarboxylic acids having from 8 to 14 carbon atoms and at least one glycol selected from among the group consisting of neo-pentyl glycol, cyclohexanedimethanol and aliphatic glycols of formula $HO(CH_2)_nOH$ in which n is an integer of from 2 to 10. Up to 50 mol % of the dicarboxylic aromatic acid can be replaced by at least one aromatic dicarboxylic acid having from 8 to 14 carbon atoms, and/or up to 20 mol % can be replaced by a dicarboxylic aliphatic acid having from 2 to 12 carbon atoms.

Preferably, the polyester is selected from the group consisting of polyethylene terephthalate (PET), poly(1,4-butylene) terephthalate (PBT), 1,4-cyclohexylene dimethylene terephthalate/isophthalate and other esters derived from aromatic dicarboxylic acids such as isophthalique acid, bibenzoic, dicarboxylic naphthalene, 4,4'-diphenylenedicarboxylic acid, bis(p-carboxyphenyl) methane acid, ethylene bis p-benzoic acid, 1,4-tetramethylene bis(p-oxybenzoic) acid, ethylene bis (para oxybenzoic) acid, 1,3-trimethylene bis (p-oxybenzoic) acid and glycols such as ethylene glycol, 1,3 trimethylene glycol, 1,4-tetramethylene glycol, 1,6-hexamethylene glycol, 1,3 propylene glycol, 1,8 octamethylene glycol, 1,10-decamethylene glycol.

Preferably, the polyester is selected from among the group consisting of polyalkylene terephthalates, particularly polyethylene terephthalate (PET), poly(1,4-butylene) terephthalate (PBT), 1,4-cyclohexylene dimethylene terephthalate/isophthalate.

According to one embodiment, the thermoplastic polymer is a polycarbonate.

Preferably, the polycarbonate is of the following general formula:

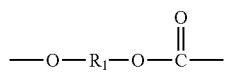

In which $R_1$ is a divalent aliphatic, alicyclic or aromatic group; the aliphatic and alicyclic groups can contain up to 8 carbon atoms.

Examples of $R_1$ can include ethylene, propylene, trimethylene, tetramethylene, hexamethylene, dodecamethylene, poly-1,4-(2-butenylene), poly-1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene.

Advantageously at least 60% of the $R_1$ groups in the polycarbonate and preferably all the $R_1$ groups are aromatic, of formula:

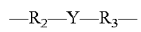

in which $R_2$ and $R_3$ are divalent monocyclic aromatic radicals and Y is a linker radical in which one or two atoms separate $R_2$ and $R_3$. The free valences are generally in meta- or para-position relative to Y.

$R_2$ and $R_3$ can be substituted or non-substituted phenylenes; substituents can be alkyls, alkenyls, halogenes, nitro and alkoxy. Non-substituted phenylenes are preferred; they can be together or separately meta or para, and are preferably para.

The linker radical Y is preferably such that one atom separates $R_2$ and $R_3$ and is preferably a hydrocarbonated radical such as methylene, cyclohexylmethylene, 2-[2,2,1] bicycloheptylmethylene, ethylene, 2,2-propylene, 1,1-(2, 2dimethylpropylene), 1,1-cyclohexylene, 1,1-cyclopentadecylene, cyclododecylene, carbonyle, radical oxy, radical thio and sulfone.

Preferably $R_1$ is 2,2-bis(4-phenylene)propane which comes from bisphenol A, i.e. Y is isopropylidene and $R_2$ and $R_3$ are each p-phenylene.

Advantageously, the intrinsic viscosity of the polycarbonate, measured in methylene chloride at 25° C., is between 0.3 and 1 dl/gram.

Preferably, the thermoplastic polymer is selected from the group consisting of polyamides, polyesters and polycarbonates and mixtures thereof.

More preferentially, the thermoplastic polymer is a polyamide.

Preferably, the thermoplastic polymer is present in a content ranging from 99.9 to 10 wt. %, preferentially in a content ranging from 99 to 40 wt. %, and more preferentially in a content ranging from 80 to 50 wt. % relative to the total weight of the composition.

The thermoplastic composition according to the invention can also comprise one or more additives selected from the group consisting of reinforcement fillers, fire retardants, thermal stabilizers, UV stabilizing agents, and pigments.

Preferably, the thermoplastic composition according to the invention comprises:
  at least one copolymer as defined above comprising at least one unit derived from ethylene and at least one unit derived from at least one alkyl (meth)acrylate, in particular a $C_1$-$C_{24}$ alkyl methacrylate, preferably selected from the group consisting of methyl acrylate, butyl acrylate and ethyl-2-hexyl acrylate and mixtures thereof,
  at least one thermoplastic polymer preferably selected from the group consisting of polyamides, polyesters, polycarbonates, phenylene polysulfides, polyacetals and mixtures thereof.

According to this embodiment, the copolymer according to the invention preferably comprises at least one unit derived from ethylene and at least one unit derived from butyl acrylate.

According to this embodiment, the thermoplastic polymer is preferably selected from the group composed of polyamides, polyesters and polycarbonates, phenylene polysulfides, polyacetals and mixtures thereof, particularly polyamides.

Thus, the thermoplastic composition according to the invention preferentially comprises:
  at least one thermoplastic polymer selected from the group composed of polyamides,
  at least one copolymer of ethylene and butyl acrylate, obtained by free-radical copolymerisation under high pressure performed in a tubular reactor, having a melt flow index (MFI) greater than or equal to 50 g/10 minutes, preferably ranging from 300 to 600 g/10 minutes, in a content ranging from 0.1 to 20 wt. % relative to the total weight of the composition.

Process of Preparing the Composition

Another object of the present invention also concerns a process for preparing the thermoplastic composition as previously defined, comprising at least one step of mixing:
one or more thermoplastic polymers, and
one or more copolymers of ethylene and acrylate(s) having a melt flow index (MFI) greater than or equal to 50 g/10 minutes, obtained by a free-radical copolymerisation process under high pressure in a tubular reactor, having a content ranging from 0.1 to 20 wt. %, calculated relative to the total weight of the mixture.

The melt flow index (MFI) of the copolymer is measured at a temperature of 190° C. under a load of 2160 g.

The copolymer of ethylene and acrylate(s) and the thermoplastic polymer are as previously described.

Preferably, the content of the copolymer of ethylene and acrylate(s) can vary from 0.25 to 20 wt. %, preferably in a content from 0.25 to 15 wt. %, more preferentially in a content ranging from 1 to 15 wt. %, and more preferentially in a content ranging from 1 to 10 wt. % relative to the total weight of the mixture.

Preferably, the content of the thermoplastic polymer can vary from 99.9 to 10 wt. %, preferentially in a content ranging from 99 to 40 wt. %, and still more preferentially in a content ranging from 80 to 50 wt. % relative to the total weight of the composition.

Advantageously, the mixing step is a step of extrusion of the copolymer of ethylene and acrylate(s) and of the thermoplastic polymer.

Thus, it is possible to obtain a composition according to the invention that is solid in the form of granules or powder.

Preferably, the mixing step takes place at a temperature beyond the melting point of the matrix to be modified and below the degradation point.

The method according to the invention makes it possible to obtain thermoplastic compositions that can be solid in the form of granules or powder which are intended to be used in the procedures of shaping or transformation for the preparation of parts.

Use of the Composition

The thermoplastic composition according to the invention is used for the preparation of a part.

In particular, the thermoplastic composition is used for the manufacture of all or a portion of a part.

Preferably, the thermoplastic composition is used for the extrusion or injection moulding of a part.

More preferentially, the thermoplastic composition is used for the injection moulding of a part.

Part

The invention also relates to a part prepared from the thermoplastic composition as defined previously.

In particular, all or a portion of the part is obtained from the thermoplastic composition as previously defined.

As used in the present invention, the part thus prepared can correspond to a finished part or a semi-finished part.

In particular, a semi-finished part corresponds to a product that can undergo one or more additional treatments to prepare the finished part.

For example, a semi-finished part can be selected from the group consisting of a plate, a section or optical fibres.

The finished part can be selected from the group consisting of an injected or extruded part.

Preferably, the part prepared from the thermoplastic composition is selected from the group consisting of an injected part.

The part advantageously has mechanical properties, particularly impact strength, that are satisfactory.

Advantageously, the part is capable of being obtained by extruding or injecting into a mould a thermoplastic composition according to the invention, particularly by injection into a mould.

In other words, the part is obtainable by the injection moulding process presented hereafter.

In particular, the part can be used in the field of electronics, computers, electrical appliances, automobiles or in the electrical industry.

Thus, the invention also concerns the use of a part as defined above in the field of electronics, computers, electrical appliances, automobiles and the electrical industry.

Injection Moulding Process

In particular, the part can be produced by means of an injection moulding process.

The process uses an injection unit comprising a material input, a material output to a mould, and one or more means of forcing the material between the material input and output.

The method comprises the following steps:
a step of introducing the thermoplastic composition, as described previously, in solid form into the input of the injection unit,
a step of forcing the composition into the injection unit at a temperature above the melting point of the said composition,
a step of injecting the hot melt thermoplastic composition into a mould at the output of the injection unit.

The injection moulding process thus makes it possible to obtain a part according to the invention.

The following examples serve to illustrate the invention, without, however, being limiting in nature.

Examples

Product A: Linear polyamide-6 (Domamid® 27, product marketed by Domo Chemicals, Italy)

Product B1: Copolymer composed of ethylene and butyl acrylate comprising 65 wt. % ethylene, having a flow index of 320 g/10 minutes and prepared in an autoclave reactor (Lotryl® 35BA320 marketed by Arkema France).

Product B2: Copolymer composed of ethylene and butyl acrylate comprising 65 wt. % of ethylene, having a flow index of 320 g/10 minutes and prepared in a tubular reactor (Lotryl® T 35BA320T marketed by Arkema France).

The compositions (1) to (3) are prepared by mixing constituents in the ratio of Table 1 by an extrusion process. The extrusion is carried out in a twin-screw co-rotational extruder 16 mm in diameter and an L/D ratio of 25 (Haake PTW16/25) at a rate of 4 kg/hour with a screw speed of 250 rpm. The maximum temperature of the mixture is 260° C. The compositions thus obtained are then dried in order to achieve a moisture rate of <0.08%.

The compositions are then injected at a temperature of 260° C. into a mould regulated at a temperature of 40° C. by means of a Krauss Maffei 60-210 B1 type injector press. Two moulds are used. A first mould to obtain bars 80 mm×10 mm×4 mm, and a second spiral mould (2 mm).

The impact strength properties are measured according to the standard ISO 179 1eA after conditioning the 80×10×4 bars at 23° C. and 50% relative humidity (RH). The higher the toughness value (given in kJ/m$^2$), the better the impact strength. These properties were measured at ambient temperature (23° C.) and when cold (−30° C.). The values obtained are reported in Table 1.

The flow properties are measured using a spiral mould 2 mm thick with a holding pressure of 1200 bars. The higher the flow length value (given in millimetres), the better the flow. The values obtained are reported in Table 1.

TABLE 1

Composition based on PA6

|  | Units | Composition 1 | Composition 2 | Composition 3 |
|---|---|---|---|---|
| Product A | % | 100 | 94 | 94 |
| Product B1 | % | — | 6 | — |
| Product B2 | % | — | — | 6 |
| Toughness at 23° C. (ISO 179 1eA) | kJ/m$^2$ | 8 | 13.6 (+70%) | 15.2 (+90%) |
| Toughness in cold, −30° C. (ISO 179 1eA) | kJ/m$^2$ | 3.2 | 6.5 (+103%) | 6.3 (+97%) |
| Flow length according to Thickness = 2 mm Holding pressure 1200 bars | mm | 620 | 802 (+29%) | 803 (+29%) |

A significant improvement can be seen in the impact strength at ambient temperature (23° C.) as well as when cold (−30° C.) of the parts obtained with a composition (composition 3) containing a polyamide and a copolymer of ethylene and acrylates prepared in a tubular reactor (Product B2) relative to parts obtained with a composition containing only the polyamide (Product A).

In the same way, a net improvement is observed in the flow of the thermoplastic composition (composition 3) comprising the copolymer of ethylene and acrylates prepared in a tubular reactor (product B2) relative to the thermoplastic composition (composition 1) comprising only the polyamide (product A).

Furthermore, a significant improvement is noted in the impact strength of the parts obtained with a composition (composition 3) containing a polyamide and a copolymer of ethylene and acrylates prepared in a tubular reactor (Product B2) relative to the parts obtained with a composition (composition 2) containing a polyamide and a copolymer of ethylene and acrylates prepared in an autoclave reactor (Product B1).

The result thereof is that the use of a copolymer of ethylene and acrylates prepared in a tubular reactor makes it possible to improve the flow of the thermoplastic composition containing the polyamide as well as the impact strength of the parts obtained from such a composition.

The invention claimed is:

1. A thermoplastic composition comprising:
at least one thermoplastic polymer; and
at least one copolymer of an ethylene and one or more acrylates, obtained by a process of free-radical copolymerisation under high pressure performed in a tubular reactor, in a content ranging from 0.1 wt. % to 20 wt. % calculated relative to the total weight of the composition, the copolymer having a melt flow index (MFI) greater than or equal to 50 g/10 minutes measured at a temperature of 190° C. under a load of 2160 g.

2. The composition according to claim 1, wherein the thermoplastic polymer is selected from the group consisting of polyamides, polyesters, polycarbonates, phenylene polysulfides, polyacetals and mixtures thereof.

3. The composition according to claim 2, wherein the thermoplastic polymer is a polyamide.

4. A process of preparing a thermoplastic composition comprising mixing:
at least one thermoplastic polymer; and
at least one copolymer of an ethylene and one or more acrylates, obtained by a process of free-radical copolymerisation under high pressure performed in a tubular reactor, in a content ranging from 0.1 wt. to 20 wt. % calculated relative to the total weight of the mixture, the copolymer having a melt flow index (MFI) greater than or equal to 50 g/10 minutes measured at a temperature of 190° C. under a load of 2160 g.

5. The process according to claim 4, wherein the mixing step is an extrusion step.

6. A process for modifying melt rheology of a thermoplastic composition, comprising adding to the thermoplastic composition a copolymer of an ethylene and one or more acrylates, obtained by a process of free-radical copolymerisation under high pressure performed in a tubular reactor, the copolymer having a melt flow index (MFI) greater than or equal to 50 g/10 minutes measured at a temperature of 190° C. under a load of 2160 g.

7. The process according to claim 6, wherein the copolymer has a melt flow index (MFI) varying from 300 to 600 g/10 minutes.

8. The process according to claim 6, wherein the one or more acrylates are selected from the group consisting of alkyl (meth)acrylates, arylalkyl (meth)acrylates and (meth)acrylates.

9. The process according to claim 8, wherein the alkyl (meth)acrylate comprises a $C_1$-$C_{30}$ alkyl (meth)acrylate.

10. The process according to claim 8, wherein the (meth)acrylate comprises an epoxy group.

11. The process according to claim 6, wherein the acrylate is selected from the group consisting of methyl acrylate, butyl acrylate, ethyl-2-hexyl acrylate, and mixtures thereof.

12. The process according to claim 6, wherein the copolymer is a copolymer of ethylene and butyl acrylate.

13. The process according to claim 6, wherein content by weight of the ethylene ranges from 50 wt. % to 95 wt. % relative to the total weight of the copolymer.

14. The process according to claim 6, wherein the content by weight of the ethylene ranges from 55 wt. % to 80 wt. % relative to the total weight of the copolymer.

15. The process according to claim 6, wherein the content by weight of the one or more acrylates ranges from 5 wt. % to 50 wt. % relative to the total weight of the copolymer.

16. The process according to claim 6, wherein the content by weight of the one or more acrylates ranges from 15 wt. % to 40 wt. % relative to the total weight of the copolymer.

17. The process according to claim 6, wherein the copolymer increases melt fluidity of the thermoplastic composition.

* * * * *

UNITED STATES PATENT AND TRADEMARK OFFICE
CERTIFICATE OF CORRECTION

Page 1 of 1

PATENT NO. : 11,555,116 B2
APPLICATION NO. : 17/041326
DATED : January 17, 2023
INVENTOR(S) : Paul Coupillaud et al.

It is certified that error appears in the above-identified patent and that said Letters Patent is hereby corrected as shown below:

On the Title Page

Item (71), Applicant, Line 1, delete "ARKEMA FRANCE, Colombes (FR)" and insert -- SK Global Chemical Co., Ltd., Seoul (KR) --

In the Claims

Column 18, Line 14, Claim 4, delete "wt." and insert -- wt. % --

Signed and Sealed this
Twenty-fifth Day of April, 2023

Katherine Kelly Vidal
*Director of the United States Patent and Trademark Office*